No. 624,851. Patented May 9, 1899.
W. NORTHROP.
FRUIT DRESSER.
(Application filed Oct. 3, 1898.)
(No Model.)
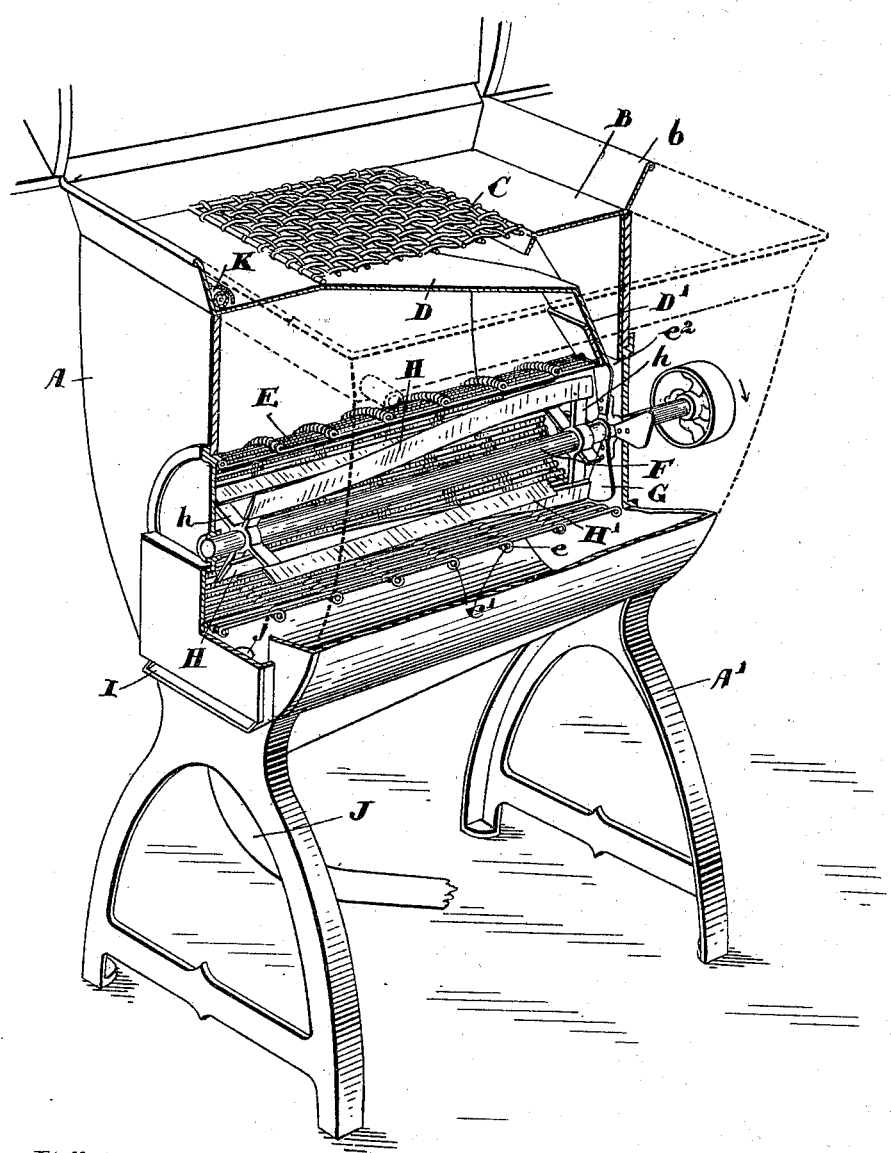
Witnesses.
A. T. S. Young.
H. Lennison.
Inventor
Walter Northrop
by
Featherstonhaugh & Co.
Attys

UNITED STATES PATENT OFFICE.

WALTER NORTHROP, OF TORONTO, CANADA.

FRUIT-DRESSER.

SPECIFICATION forming part of Letters Patent No. 624,851, dated May 9, 1899.

Application filed October 3, 1898. Serial No. 692,532. (No model.)

*To all whom it may concern:*

Be it known that I, WALTER NORTHROP, of the city of Toronto, in the county of York, in the Province of Ontario, Canada, have invented certain new and useful Improvements in Fruit-Dressers, of which the following is a specification.

My invention relates to improvements in fruit-dressers; and the object of the invention is to design a simple machine whereby fruit—such as currants, raisins, and the like—may be stemmed and cleaned at one operation; and it consists, essentially, of a casing provided with a suitable upper sieve, an inclined chute beneath such sieve, and a rotating fan beneath the bottom of the chute, around which is secured in the casing a wire cylinder, such shaft being provided with a screw conveyer which rotates with the shaft, the fruit being fed with water into the fan-casing and wire cylinder and ejected out of the opposite end through a spout, the parts being arranged and constructed in detail as hereinafter more particularly explained.

The drawing represents a sectional perspective view of a machine constructed in accordance with my invention.

A is the casing, which is provided with a suitable stand or legs A'.

B is the upper table, which is provided with a suitable rim $b$ and a central sieve of suitable wire mesh C, whereby large foreign matter is prevented from entering upon the chute D, which is located beneath the sieve C, and the narrow extension D', which leads down into the wire cylinder E.

F is the main shaft of the machine, which is journaled in suitable bearings at each end and is suitably driven. One end of the shaft inside the casing is provided with a fan G. To the inside of the fan are arranged the spiral and straight blades H and H', alternately arranged, which are held on suitable arms $h$ on the shaft F and form a fan. The inclined blades H extend continuously from end to end in the form of a very steep screw-thread, so that they serve as a screw conveyer and for the purpose which will hereinafter be mentioned. The cylinder E is constructed of a series of lengths of wire, with intermediate loops $e$, through which are passed round circumferential wires $e'$, by which the cylinder is held together, such cylinder being stationary and provided with an opening $e^2$ at one end underneath the chute D'.

At the opposite end of the machine is a spout I, through which the clean fruit passes, as hereinafter described. At the opposite end of the machine, also at the bottom of the casing, is an orifice $j$, which leads to a pipe J, by which the water is carried off. The pipe K is provided at the top of the machine, through which the water is flooded onto and through the fruit on the sieve C. The water and fruit pass down through the chute D' to the fan G, which, rotating at a high rate of speed, beats against the fruit, fanning it and throwing it into the range of the blades H H'. From the fan the fruit necessarily is conveyed, on account of the shape of the blades of such fan, into the main portion of the cylinder in which the revolving blades or major fan is placed. Such blades have their edges situated a short distance from the interior of the cylinder, and of course as the water passes down through the open cylinder the fruit is left in such cylinder, and the blades, rotating at a high rate of speed, fan the fruit and dry it and by centrifugal force cause it to frictionally rub against the bars of the cylinder, thereby relieving such fruit, whether currants or raisins, of their stems.

The straight blades tend to throw the fruit directly against the screen-walls of the cylinder, while the inclined blades throw it obliquely. This tends to dash the fruit together and against different parts of the screen, and at the same time the inclined blades work it gradually toward the discharge end. Both create a current of air, and the stems and other adhering particles are detached from the fruit by collision of the fruit with itself and with the walls. The peculiar construction of the walls renders it more effective in beating than a smooth surface and at the same time allows the detached particles to pass through and be sifted out.

The dried fruit by the inclined form of the blades is carried from one end of the cylinder to the other and passes out through the spout I and the waste water through the pipe J.

The straight blades H' act solely as fans or directors to throw the fruit against the walls of the cage and create a current of air. The inclined blades serve this purpose and also serve to gradually convey the fruit toward the discharge end of the cage. It will be observed that they do not approach near enough to the walls of the cage to rub the fruit, nor do they act as a brush, as in machines prior to my invention, but simply serve to strike the fruit and throw it against the walls and to create a current of air at the same time and also to convey the fruit gradually, as heretofore explained.

What I claim as my invention is—

In a fruit-dresser, and in combination a casing, a sieve and water-supply arranged in the top of said casing, said sieve being fitted to permit the fruit to pass through, an inclined chute underneath the sieve arranged to convey the fruit and water to the receiving end of a cylinder, said cylinder being underneath the said sieve and made with openings for the passage of the air and water but adapted to retain the fruit, a shaft arranged axially in said cylinder and provided with a fan at the receiving end, blades H and H', one set inclined and the other straight, having their edges arranged to leave a space between the blades and the inner surface of the cylinder and means for discharging the fruit and water, substantially as described.

WALTER NORTHROP.

Witnesses:
B. BOYD,
WALTER H. ARMS.